United States Patent
Chien

(10) Patent No.: US 6,875,101 B1
(45) Date of Patent: Apr. 5, 2005

(54) COMPUTER HOUSING VENTILATION ARRANGEMENT

(76) Inventor: Robert Chien, 161 Mercury Cir., Pomona, CA (US) 91768

( * ) Notice: Subject to any disclaimer, the term of this patent is extended or adjusted under 35 U.S.C. 154(b) by 0 days.

(21) Appl. No.: 10/714,873

(22) Filed: Nov. 18, 2003

(51) Int. Cl.$^7$ ............................................. H05K 7/20
(52) U.S. Cl. ............... 454/184; 248/188.8; 248/346.01; 361/695
(58) Field of Search .................... 454/184; 361/695; 211/27, 85.17; 248/671, 677, 188.8, 346.01

(56) References Cited

U.S. PATENT DOCUMENTS

| | | | | |
|---|---|---|---|---|
| 1,800,148 A | * | 4/1931 | Conwell et al. | 248/188.8 |
| 2,899,165 A | * | 8/1959 | James | 248/188.8 |
| 3,103,105 A | * | 9/1963 | Weil | 62/172 |
| 3,519,233 A | * | 7/1970 | Logsdon | 248/146 |
| 5,000,079 A | * | 3/1991 | Mardis | 454/184 |
| 5,559,673 A | * | 9/1996 | Gagnon et al. | 361/695 |
| 6,011,689 A | * | 1/2000 | Wrycraft | 361/695 |
| 6,056,256 A | * | 5/2000 | Ponce | 248/346.01 |
| 6,466,443 B1 | * | 10/2002 | Chen | 361/695 |
| 6,554,697 B1 | * | 4/2003 | Koplin | 454/184 |
| 6,568,650 B2 | * | 5/2003 | Helmetsie et al. | 248/678 |
| 2004/0047124 A1 | * | 3/2004 | Hsieh et al. | 361/687 |

* cited by examiner

Primary Examiner—Harold Joyce
(74) Attorney, Agent, or Firm—East IP Group; Philip K. Yu

(57) ABSTRACT

A computer housing ventilation arrangement includes a computer case having an opening in the bottom panel, a wire gauze filter mounted in the opening of the computer case, and electric fan mounted inside the opening and adapted to draw outside cooling air upwardly into the inside of the computer case through the opening to lower the inside temperature of the computer case, and a deck adapted to support the computer case above a flat surface.

4 Claims, 10 Drawing Sheets

COMPUTER HOUSING VENTILATION ARRANGEMENT

BACKGROUND OF THE INVENTION

1. Field of the Invention

The present invention relates generally to computer housings and, more specifically, to a computer housing ventilation arrangement.

2. Description of the Related Art

A personal computer is generally equipped with an electric fan adapted to cool the temperature of the power supply module and to draw inside hot air to the outside of the computer case. Because the electric fan draws inside hot air to the outside of the computer case in a horizontal direction toward the back panel of the computer case, outside cooling air cannot be circulated through the computer case to effectively lower the inside temperature of the computer. Further, following fast development of computer technology, various advanced CPUs of fast operation speed have been continuously developed. A CPU of relatively higher operation speed produces relatively greater amount of heat energy, i.e., the faster the operation speed of a CPU is the higher the working temperature of the CPU will be. Excessive high working temperature affects normal functioning of the CPU. Various heat sinks and CPU cooling devices have been disclosed for use to lower CPUs' working temperature. However, these devices are specifically designed to lower CPUs' working temperature. They do not improve the ventilation of the computer.

SUMMARY OF THE INVENTION

The present invention has been accomplished under the circumstances in view. It is the main object of the present invention to provide a computer housing ventilation arrangement, which greatly improves the ventilation of the computer. It is another object of the present invention to provide a computer housing ventilation arrangement, which effectively lowers the inside temperature of the computer during the operation of the computer. According to one aspect of the present invention, the computer housing ventilation arrangement comprises a computer case, the computer case having at least one opening in the bottom panel, at least one wire gauze filter respectively mounted in the at least one opening, and at least one electric fan respectively mounted inside the at least one opening and adapted to draw outside cooling air upwardly into the inside of the computer case through the at least one opening. According to another aspect of the present invention, a deck is provided to support the computer case above a flat surface, enhancing ventilation through the computer case.

DETAILED DESCRIPTION OF THE INVENTION

Figure 1:
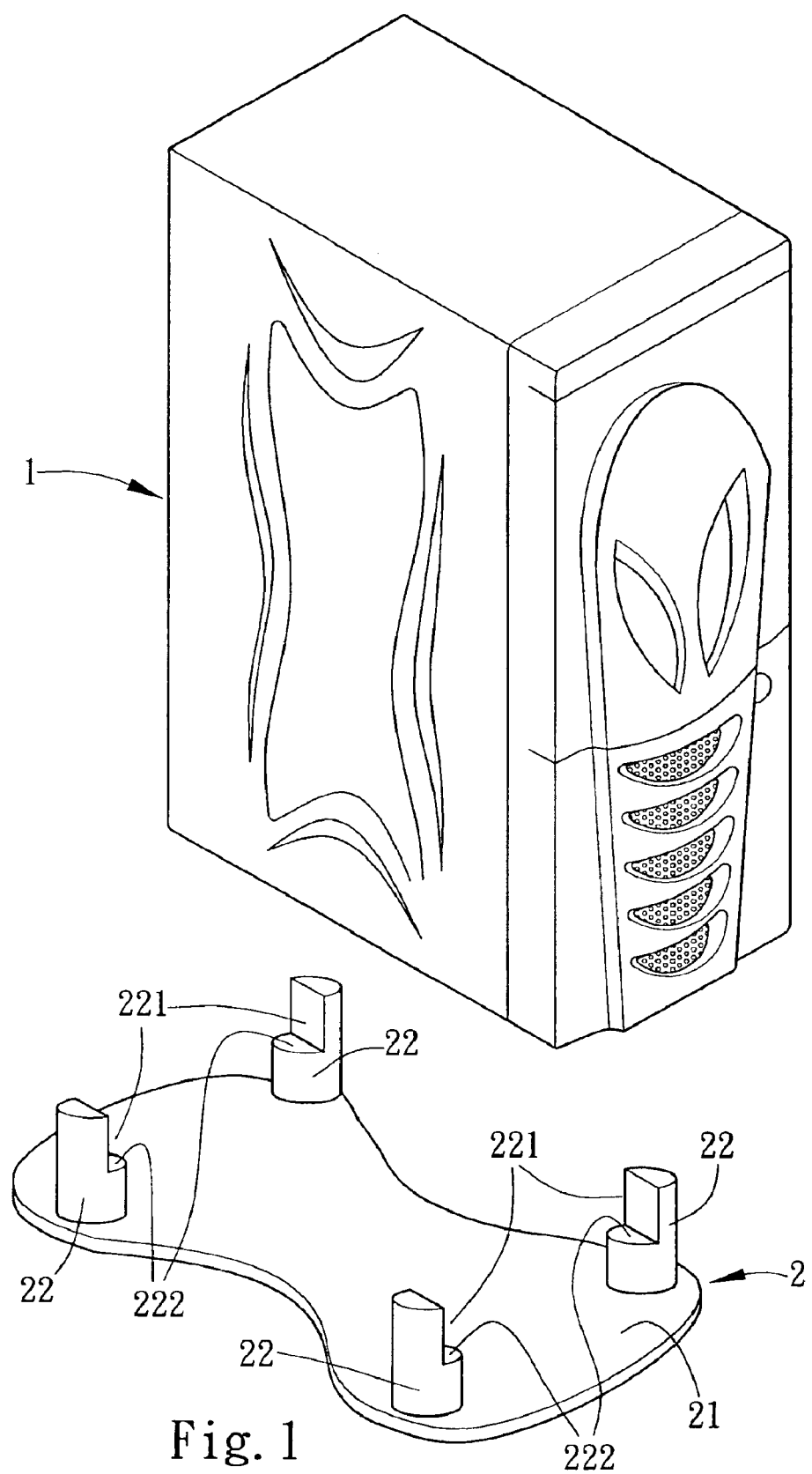
FIG. 1 is an exploded view of one embodiment of the present invention.
Figure 2:
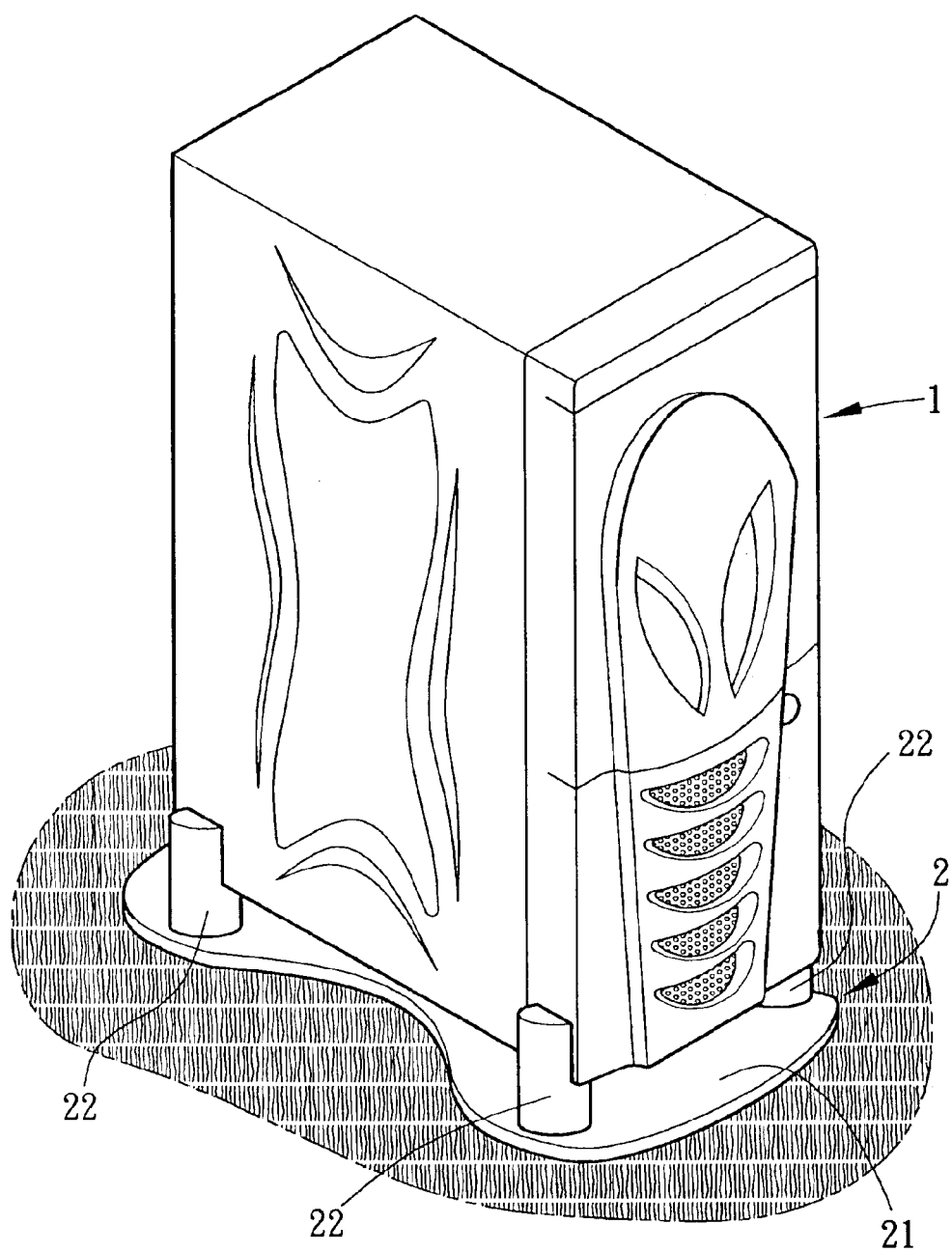
FIG. 2 is an assembly view of the embodiment shown in FIG. 1.
Figure 3:
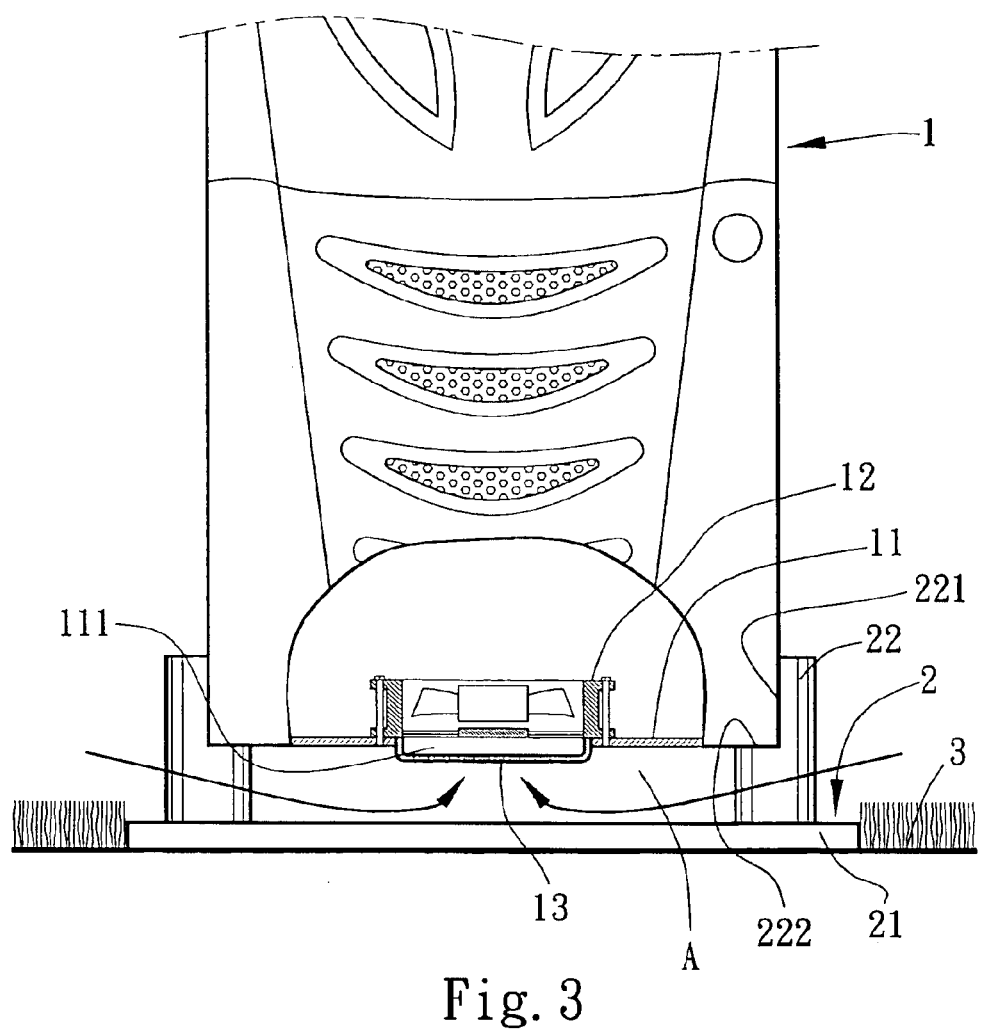
FIG. 3 is a sectional front view in an enlarged scale of the embodiment shown in FIG. 1.
Figure 4:
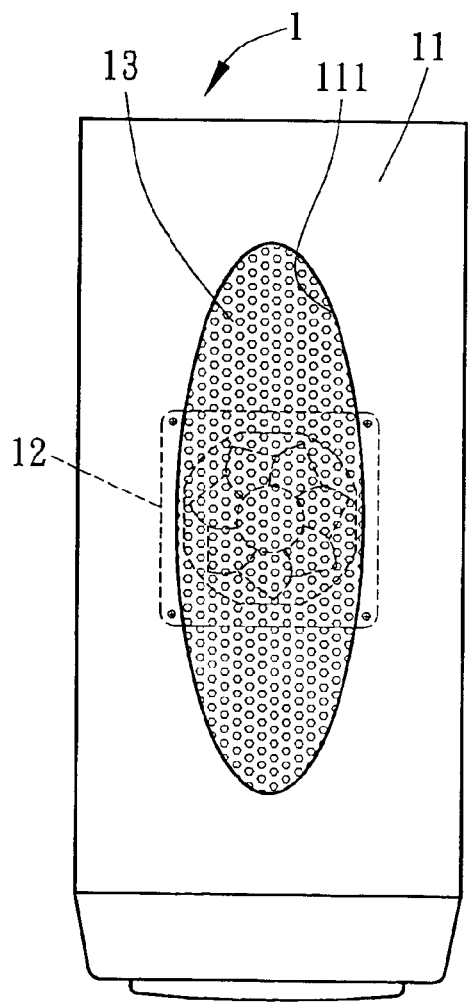
FIG. 4 is a bottom view of the embodiment shown in FIG. 1.

Referring to FIGS. 1–4, the computer case, referenced by 1, has an opening 111 in the bottom panel 11, and a fan 12 mounted inside the opening 111 and adapted to draw outside cooling air upwardly through the opening 111 into the inside of the computer case 1 to lower the internal temperature level of the computer case 1. A deck 2 is provided to support the computer case 1 above the floor 3, defining a ventilation gap A between the bottom panel 11 of the computer case 1 and the floor 3 for ventilation. The deck 2 comprises a flat base plate 21 and a plurality of upright supports 22 in four corners of the flat base plate 21. The upright supports 22 each have a top cut 221 defining a horizontal seat 222 for the resting of the bottom panel 11 of the computer case 1. A wire gauze filter 13 may be installed in the opening 111 to filtrate solid matter from currents of air passing through the opening 111. According to this embodiment, the opening 111 is an oval opening. The wire gauze filter 13 has an oval shape fitting the oval opening 111.

Figure 5:
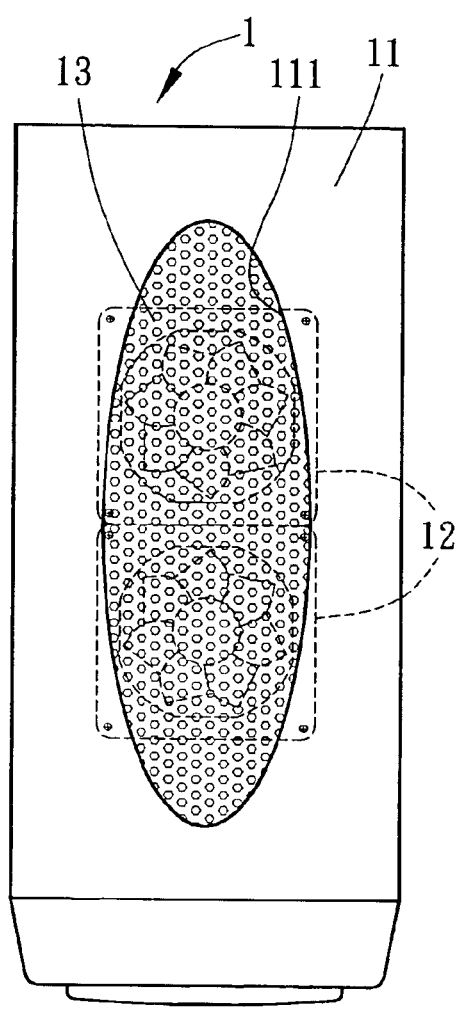
FIG. 5 is a bottom view of an alternate form of the present invention, showing two fans provided inside the oval opening in the bottom panel of the computer case.

FIG. 5 shows an alternate form of the present invention. According to this alternate form, two fans 12 are provided inside the oval opening 111.

Figures 6, 7:
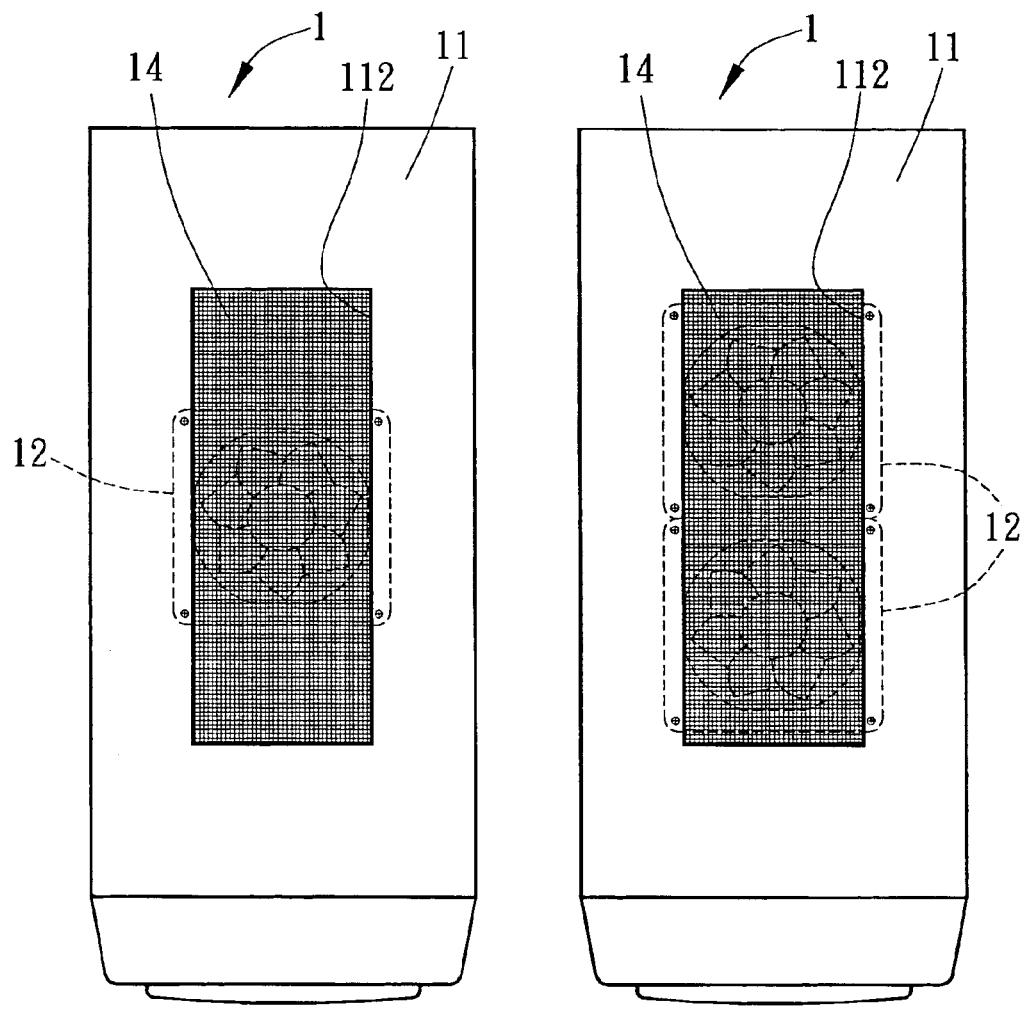
FIG. 6 is a bottom view of another alternate form of the present invention, showing one fan provided inside the rectangular opening in the bottom panel of the computer case.
FIG. 7 is a bottom view of still another alternate form of the present invention, showing two fans provided inside the rectangular opening in the bottom panel of the computer case.

FIG. 6 shows another alternate form of the present invention. According to this alternate form, the opening 112 of the computer case 1 is a rectangular opening in which one fan 12 is installed, and the wire gauze filter 14 has a rectangular shape fitting the rectangular opening 111.

FIG. 7 shows still another alternate form of the present invention. According to this alternate form, two fans 12 are provided inside the rectangular opening 111.

Figures 8, 9:
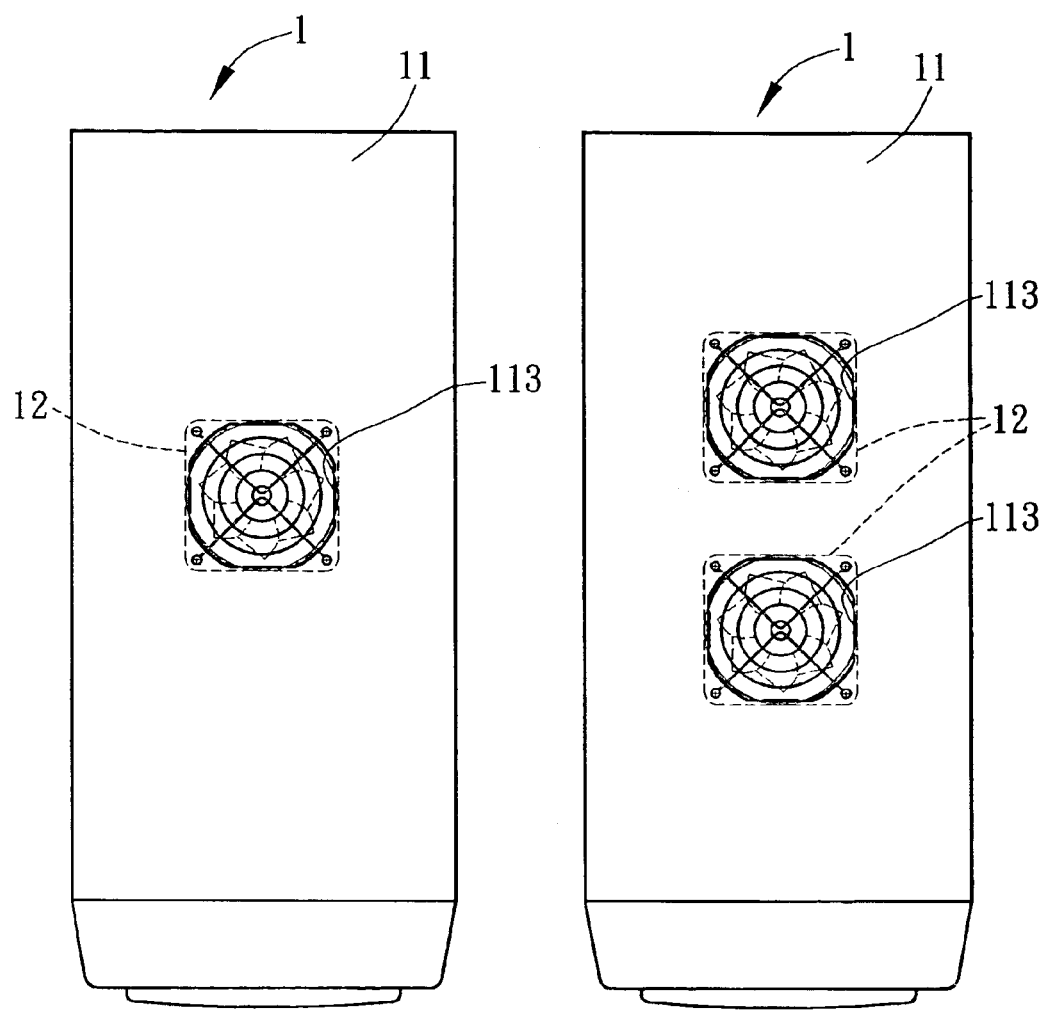
FIG. 8 is a bottom view of still another alternate form of the present invention, showing one fan provided inside the circular opening in the bottom panel of the computer case.
FIG. 9 is a bottom view of still another alternate form of the present invention, showing two fans provided inside the circular opening in the bottom panel of the computer case.

FIG. 8 shows still another alternate form of the present invention. According to this alternate form, the opening 113 is a circular opening in which one fan 12 is installed.

FIG. 9 shows still another alternate form of the present invention. According to this alternate form, the computer case 1 has two circular openings 113 in the bottom panel 11, and two fans 12 respectively mounted in the circular openings 113.

Figure 10:
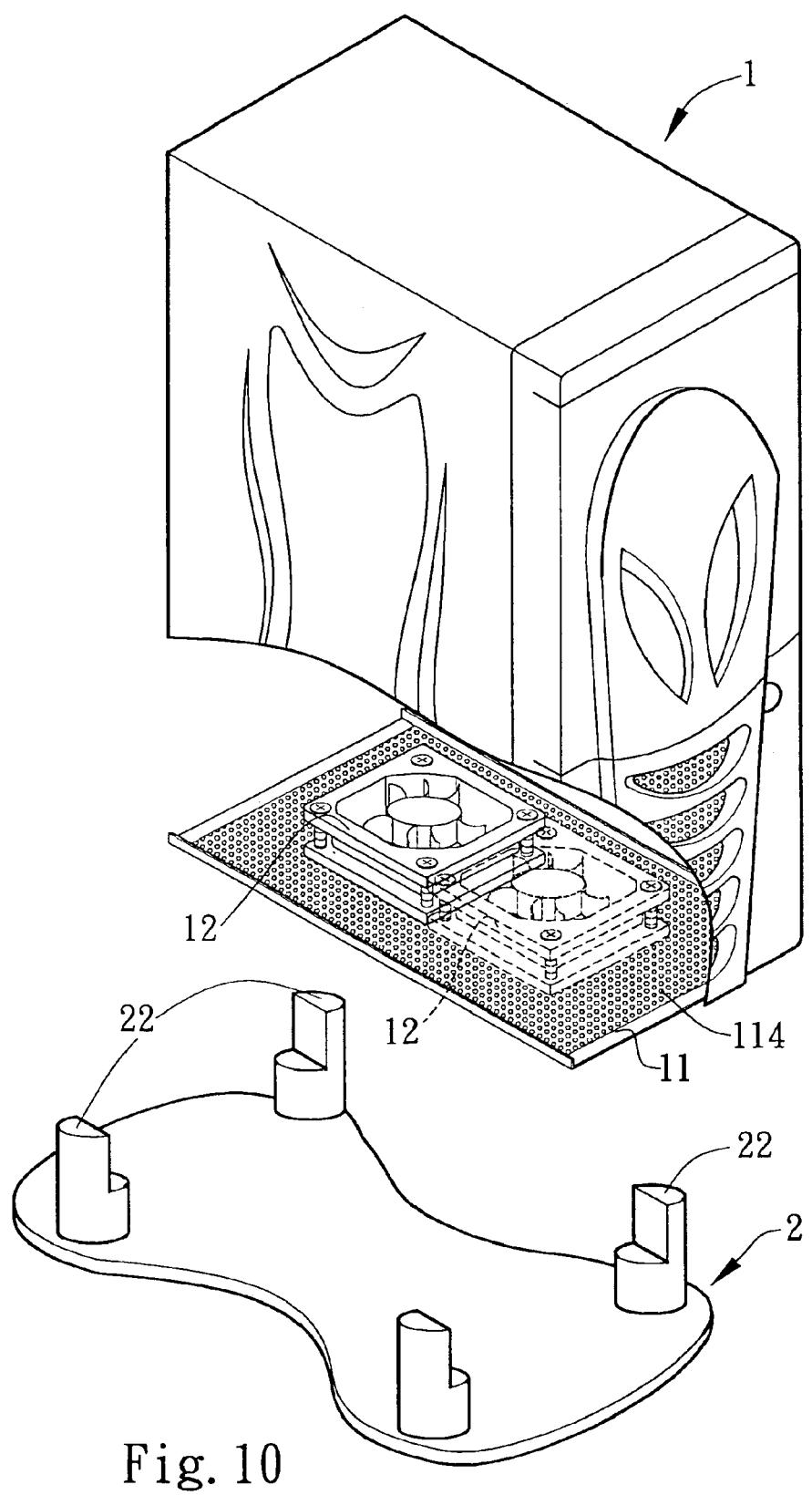
FIG. 10 is an exploded view of still another alternate form of the present invention, showing air vents formed in the bottom panel of the computer case around the fans.

FIG. 10 shows still another alternate form of the present invention. According to this alternate form, the bottom panel 11 of the computer case 1 is perforated, having a plurality of air vents 114 around the fans 12.

Figure 11:
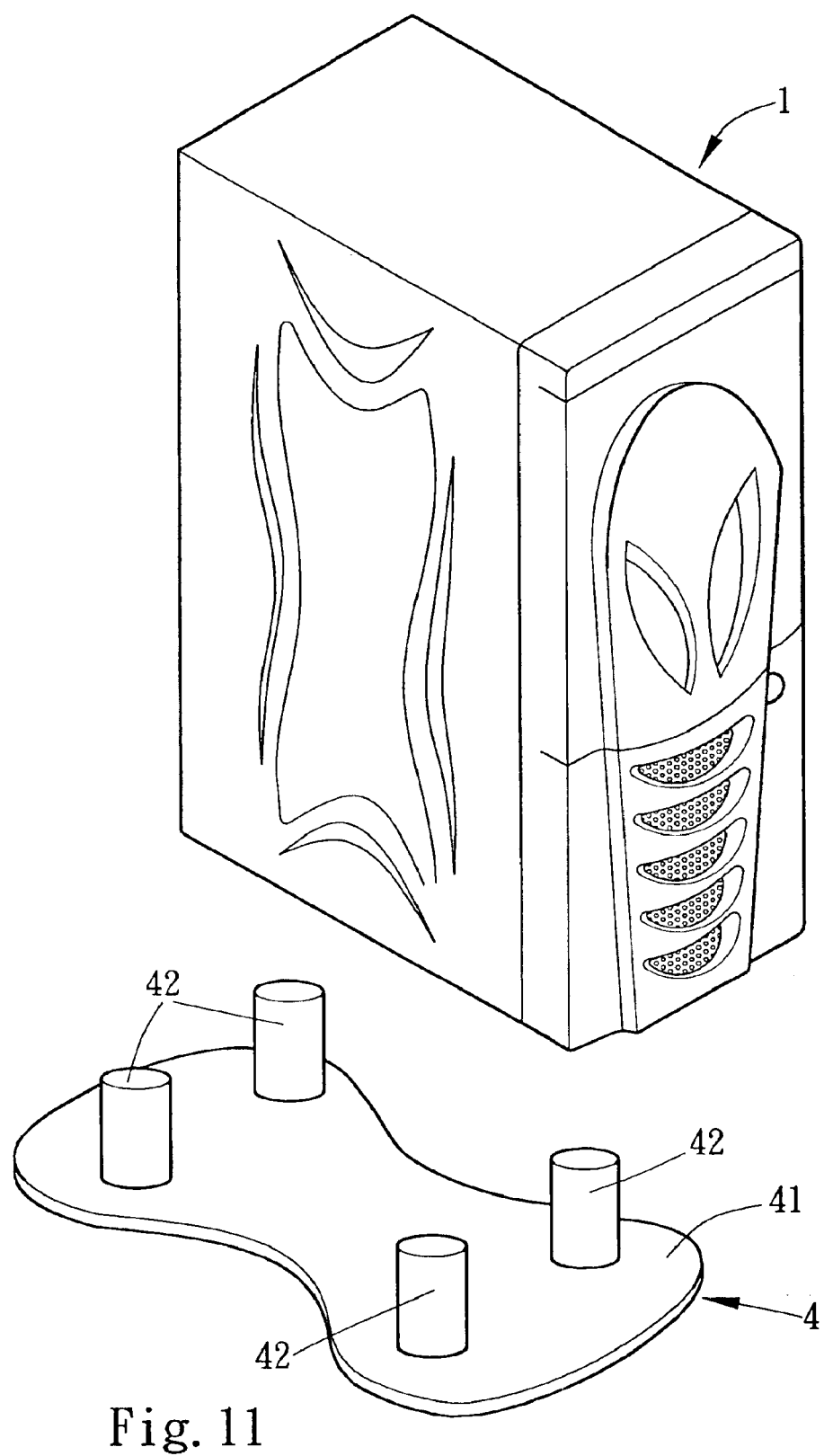
FIG. 11 is an exploded view of a still another alternate form of the present invention.
Figure 12:
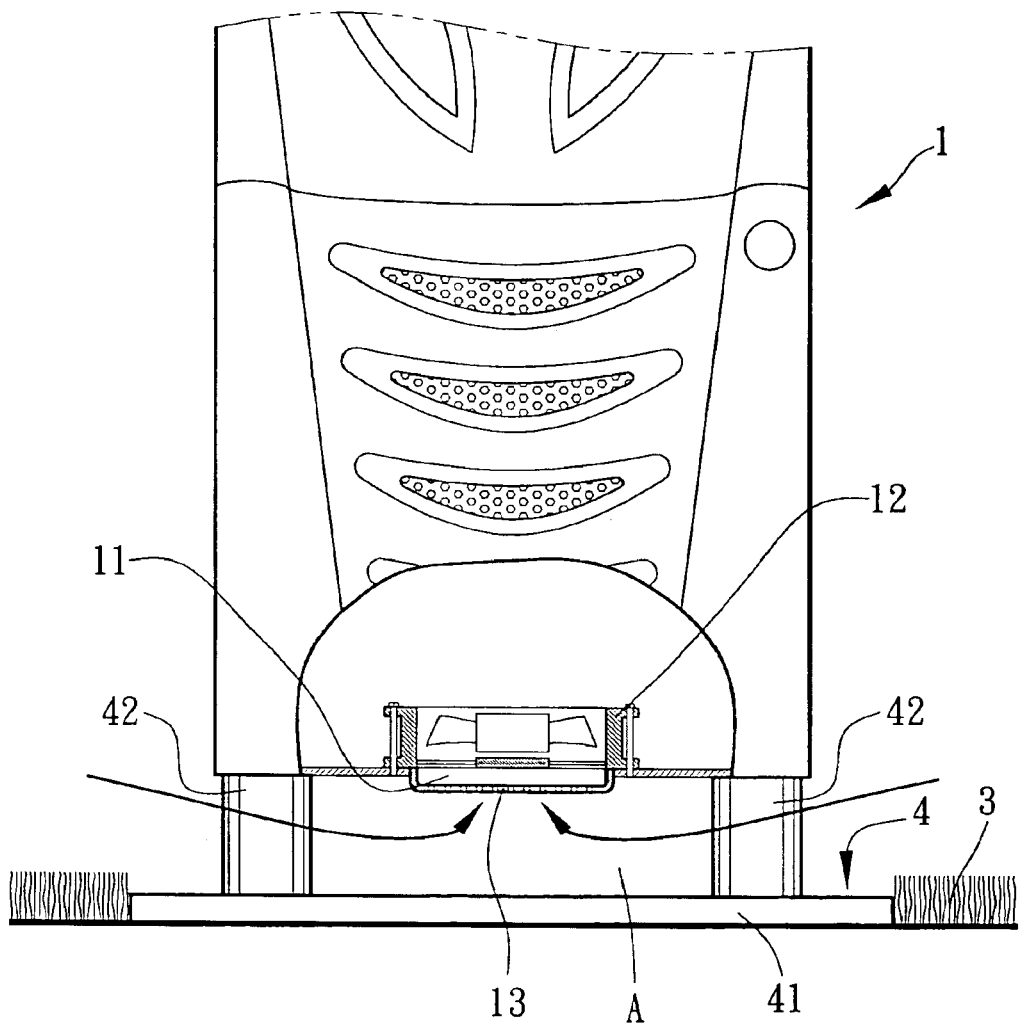
FIG. 12 is a front view in section of the embodiment shown in FIG. 11.
Figure 13:
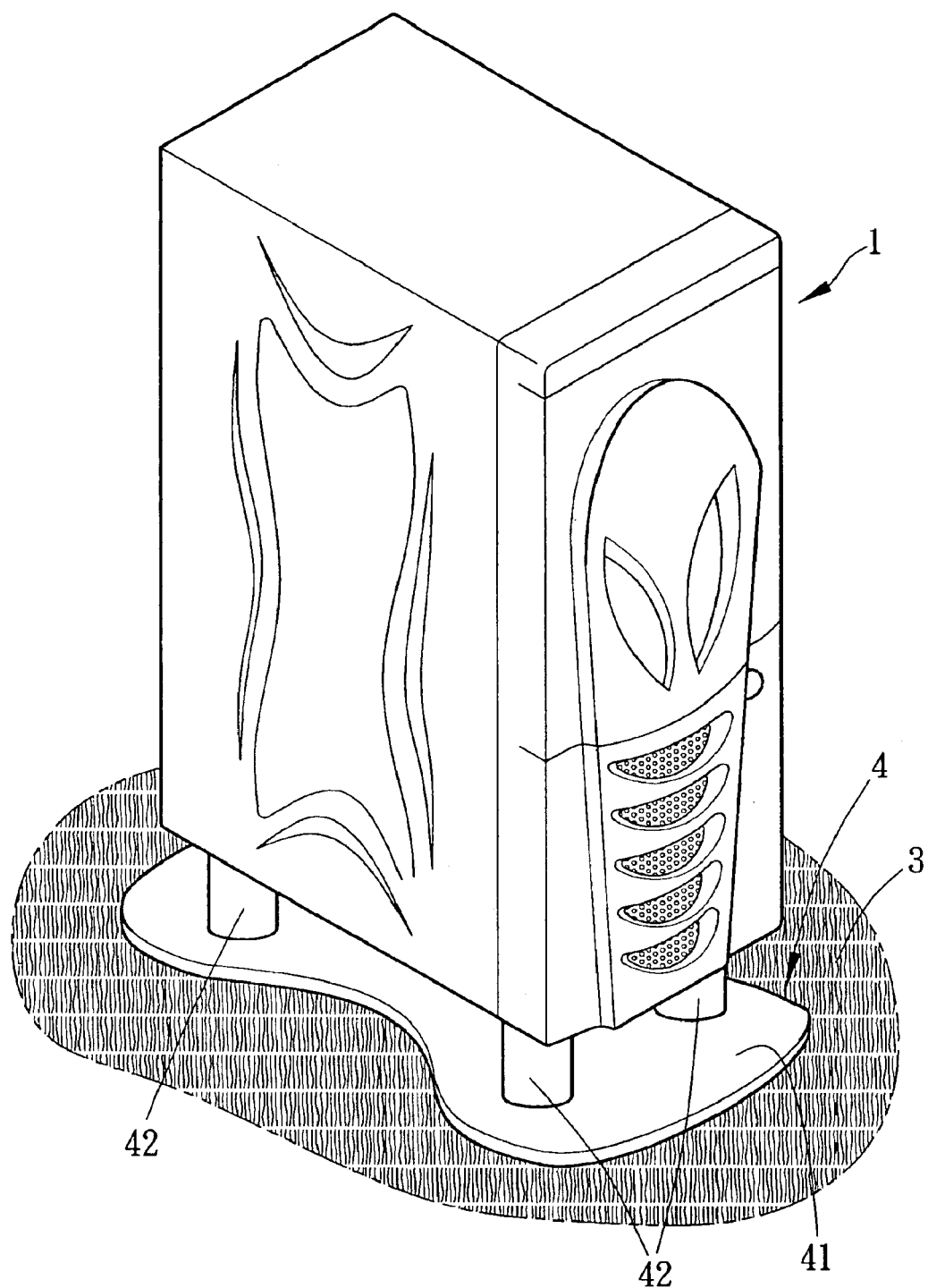
FIG. 13 is an elevational assembly view of the embodiment shown in FIG. 11.

FIGS. 11–13 show still another alternate form of the present invention. According to this embodiment, the deck, referenced by 4, comprises a flat bottom plate 41 and a plurality of upright supports 42 in the four corners of the flat bottom plate 41. The upright supports 42 are round rods having a respective flat topmost edge adapted to support the flat bottom panel of the computer case 1.

Further, instead of the aforesaid deck 2 or 4, an independent support may be used to support the computer case 1 above the floor 3, defining a ventilation gap A between the bottom panel 11 of the computer case 1 and the floor 3 for ventilation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A computer housing ventilation arrangement comprising:
   a computer case, said computer case having a bottom panel and at least one opening in said bottom panel:
   at least one electric fan mounted inside said at least one opening and adapted to draw outside cooling air upwardly through said at least one opening into the inside of said computer case: and
   a deck adapted to support said computer case above a flat surface, said deck comprising a flat base plate for positioning on a flat surface, and a plurality of upright supports adapted to support the bottom panel of said computer case above said flat base plate, wherein said upright supports of said deck each has a top notch defining a horizontal seat adapted to support the bottom panel of said computer case.

2. A computer housing ventilation arrangement comprising:
   a computer case, said computer case having a bottom panel and at least one opening in said bottom panel; and
   a deck adapted to support said computer case above a flat surface, said deck comprising a flat base plate for positioning on a flat surface, and a plurality of upright supports upwardly extended from said flat base plate and adapted to support the bottom panel of said computer case above said flat base plate, wherein said upright supports of said deck each have a top notch defining a horizontal seat adapted to support the bottom panel of said computer case.

3. A computer housing ventilation arrangement comprising:
   a computer case, said computer case having a bottom panel and at least one opening in said bottom panel;
   at least one electric fan mounted inside said at least one opening and adapted to draw outside cooling air upwardly through said at least one opening into the inside of said computer case; and
   a deck adapted to support said computer case above a flat surface, said deck comprising a flat base plate for positioning on a flat surface, and a plurality of upright supports adapted to support the bottom panel of said computer case above said flat base plate, wherein said upright supports each has a top defining a horizontal seat adapted to support the bottom panel of said computer case.

4. A computer housing ventilation arrangement comprising:
   a computer case, said computer case having a bottom panel and at least one opening in said bottom panel; and
   a deck adapted to support said computer case above a flat surface, said deck comprising a flat base plate for positioning on a flat surface, and a plurality of upright supports upwardly extended from said flat base plate and adapted to support the bottom panel of said computer case above said flat base plate, wherein said upright supports of said deck each has a top defining a horizontal seat adapted to support the bottom panel of said computer case.

* * * * *